(12) United States Patent
Sugiyama

(10) Patent No.: US 8,331,770 B2
(45) Date of Patent: Dec. 11, 2012

(54) RECORDING APPARATUS AND METHOD, RECORDING MEDIUM, AND PROGRAM

(75) Inventor: Katsuhiro Sugiyama, Chiba (JP)

(73) Assignee: Sony Corporation, Tokyo (JP)

( * ) Notice: Subject to any disclaimer, the term of this patent is extended or adjusted under 35 U.S.C. 154(b) by 1164 days.

(21) Appl. No.: 11/284,036

(22) Filed: Nov. 22, 2005

(65) Prior Publication Data

US 2006/0114786 A1 Jun. 1, 2006

(30) Foreign Application Priority Data

Nov. 29, 2004 (JP) ................ P2004-344077

(51) Int. Cl.
*H04N 5/89* (2006.01)
*H04N 5/92* (2006.01)
*G06F 3/00* (2006.01)
*G06F 13/00* (2006.01)
*G11B 5/09* (2006.01)
*G11B 27/36* (2006.01)

(52) U.S. Cl. ....... 386/334; 386/338; 386/340; 369/47.1; 369/47.4; 369/53.2; 369/53.41; 710/14; 711/111; 711/154

(58) Field of Classification Search ................. 386/106, 386/96, 125, 126, E5.027, E9.013, 97, E9.038, 386/E9.04; 369/47.1, 47.4, 53.2, 53.41, 275.3; 375/E7.004; 707/3, 102, 104.1, E17.026; 710/14; 711/111, 154; G9B/7.005, 17.001, G9B/19.02, 19.027, 19.046, 20.009, 27.019, G9B/27.021, 27.029, 27.03, 27.05, 27.051, G9B/19.007, 27.013, 27.052, 27.012, 27.033, G9B/20.029

See application file for complete search history.

(56) References Cited

U.S. PATENT DOCUMENTS

| 5,561,644 | A * | 10/1996 | Kondo ................. 369/47.4 |
| 5,712,949 | A * | 1/1998 | Kato et al. .............. 386/96 |
| 6,067,282 | A * | 5/2000 | Moriyama et al. ...... 369/53.41 |
| 6,104,684 | A * | 8/2000 | Moriyama et al. ....... 386/96 |
| 6,408,301 | B1 * | 6/2002 | Patton et al. ............ 707/741 |
| 6,484,233 | B1 * | 11/2002 | Fujinami et al. ......... 711/111 |
| 2005/0019023 | A1 * | 1/2005 | Ko ..................... 386/125 |
| 2006/0062120 | A1 * | 3/2006 | Gohda ................. 369/53.2 |

FOREIGN PATENT DOCUMENTS

| JP | 2002-005669 A | * | 1/2002 |
| JP | 2003-030963 | | 1/2003 |
| JP | 2003-163867 | | 6/2003 |
| JP | 2003303472 A | * | 10/2003 |
| JP | 2004-206824 | | 7/2004 |

* cited by examiner

*Primary Examiner* — Thai Tran
*Assistant Examiner* — Syed Hasan
(74) *Attorney, Agent, or Firm* — Finnegan, Henderson, Farabow, Garrett & Dunner, L.L.P.

(57) ABSTRACT

A recording apparatus includes first identification means for identifying, in accordance with information read from a disk medium and related to a format of data recorded on the disk medium, the format defined from a purpose of the recorded data and a version of the format; storage means for storing data in which the version and information on whether processing that can be executed is executable are associated; determination means for determining, in accordance with the version and by referring to the data stored in the storage means, whether processing that can be executed is limited; generation means for generating first image data for displaying a first image representing that the processing that can be executed is limited when the determination means determines that the processing that can be executed is limited; and display control means for controlling display of the first image in accordance with the first image data.

8 Claims, 8 Drawing Sheets

|  | Ver 1.2 | Ver 2.0 |
|---|---|---|
| MOVING IMAGE RECORDING | YES | YES |
| STATIC IMAGE RECORDING | NO | YES |

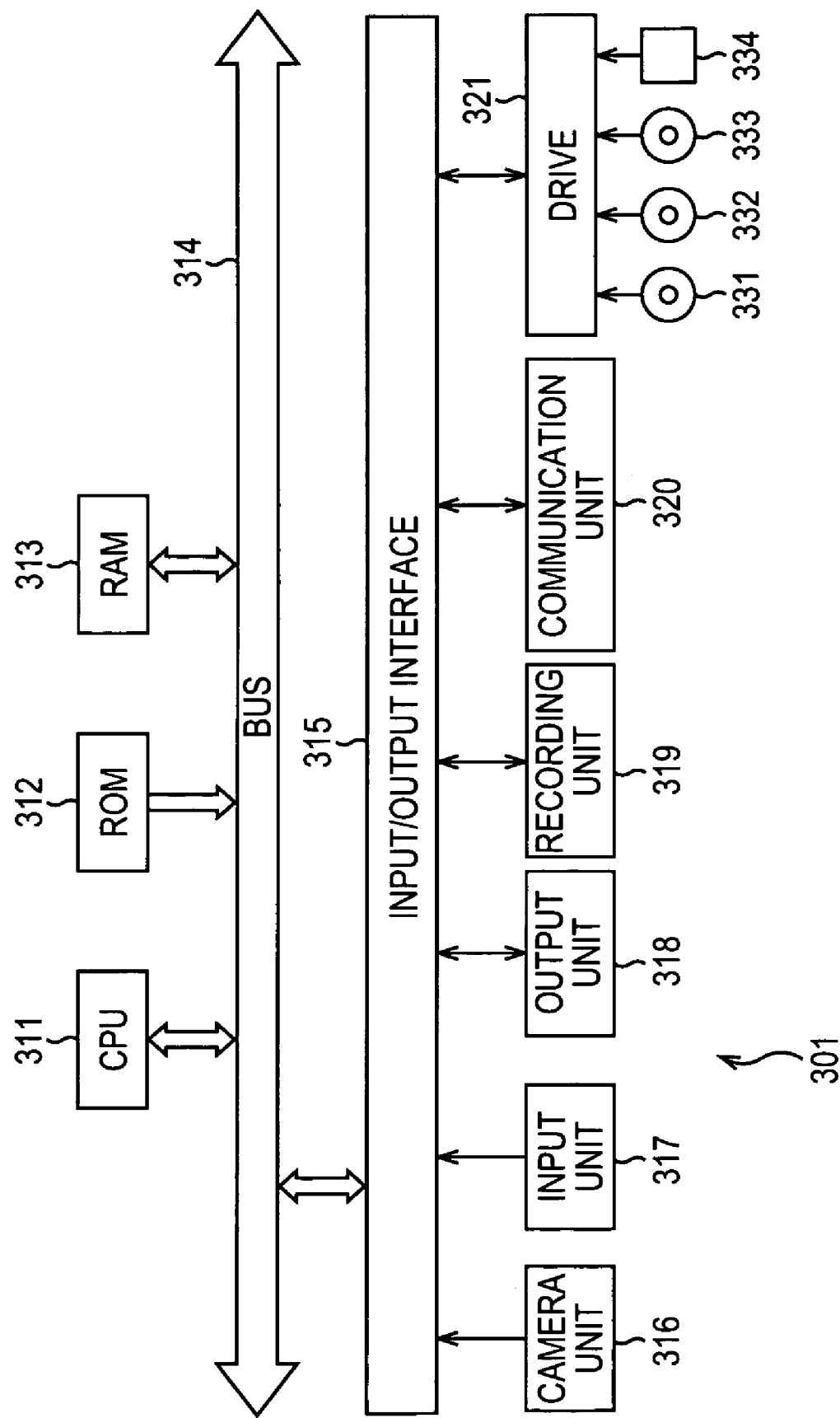

RECORDING APPARATUS AND METHOD, RECORDING MEDIUM, AND PROGRAM

CROSS REFERENCES TO RELATED APPLICATIONS

The present invention contains subject matter related to Japanese Patent Application JP 2004-344077 filed in the Japanese Patent Office on Nov. 29, 2004, the entire contents of which are incorporated herein by reference.

BACKGROUND OF THE INVENTION

1. Field of the Invention

The present invention relates to recording apparatuses, recording methods, recording media, and programs, and more particularly, to a recording apparatus, a recording method, a recording medium, and a program capable of presenting executable processing on a screen for a user.

2. Description of the Related Art

Recently, digital video cameras using optical disks, such as digital versatile disks (DVDs), as recording media have been widely used. The system structure of optical disks installed in such digital video cameras is defined based on hierarchy, such as a physical layer, a logical layer, and an application layer. In this case, one or more elements of optical disks are defined in a plurality of layers, and elements of digital video cameras are defined so as to correspond to the one or more elements defined in the plurality of layers of optical disks.

More specifically, when an optical disk is a DVD, elements are defined as described below. In the physical layer, for example, the structure, the modulation system, and the error-correcting system of the disk, such as DVD Specifications for Recordable Disc (DVD-R), DVD Specifications for Re-recordable Disc (DVD-RW), or DVD Specifications for +Re-Writable Disc (DVD+RW), are defined as information of the type of DVD. In the logical layer, for example, a Universal Disk Format (UDF) or a UDF Bridge is defined as a logical format of a file system (hereinafter, referred to as a file format). In the application layer, for example, a DVD-Video format (hereinafter, referred to as a "video mode"), a DVD Video Recording format (hereinafter, referred to as a "VR mode"), or a DVD+RW Video Recording format (hereinafter, referred to as a "+VR mode") is defined as an application format (hereinafter, referred to as a recording format) for recording data on the DVD.

More specifically, when a digital video camera is capable of dealing with a DVD whose DVD type is "DVD+RW" and a recording format of a "+VR mode", data can be recorded on the optical disk whose DVD type is "DVD+RW" in the recording format "+VR mode".

In order to photograph an object using such a digital video camera, a user installs a DVD in a drive of the digital video camera. The digital video camera identifies an element in the physical layer. That is, the digital video camera determines the type of the DVD installed in the drive (for example, determines whether a DVD of a "DVD-R" type or a "DVD+RW" type is installed). In addition, the digital video camera identifies an element in the application layer. That is, the digital video camera determines the recording format of the DVD installed in the drive (for example, determines whether the recording format is a "video mode" or a "+VR mode").

As a result of such identification, a known digital video camera displays a screen on a display unit 1, as shown in FIG. 1.

FIG. 1 shows the display unit 1 displaying a screen of the known digital video camera.

On the upper right portion of the display unit 1 displaying the screen shown in FIG. 1 of the known digital video camera, a media icon 2-1 representing that the type of disk defined in the physical layer of the installed DVD (optical disk) is "+RW" (that is, "DVD+RW") and a recording format icon 2-2 representing that the type of recording format defined in the application layer is "VIDEO" (that is, a DVD+RW Video Recording format ("+VR mode")) are shown from the top in that order.

Accordingly, in the known digital video camera, the user is able to identify that the installed DVD is rewritable, that is, the "DVD+RW" type, and that the type of recording format defined in the application layer is "VIDEO" by looking at an icon set 2 including the media icon 2-1 and the recording format icon 2-2.

In addition, a counter 3 representing that an elapsed recording time is 0:00:00, that is, recording is not performed, is shown on the left of the icon set 2. In addition, a remaining battery level 4 representing that the remaining battery time is 120 minutes is shown on the left of the counter 3.

As described above, the known digital video camera indicates the type of disk and the type of recording format.

A camera-integrated recorder that identifies the type of disk, which is an element defined in a physical layer, and the type of recording format, which is an element defined in an application layer, in accordance with a disk profile of an optical disk read from a drive, that generates information (icons or the like) corresponding to the type of disk and the type of recording format, and that displays video data on which the generated information is superimposed is described, for example, in Japanese Unexamined Patent Application Publication No. 2004-206824.

SUMMARY OF THE INVENTION

However, since a version is defined for each of a recording format defined in an application layer and a file format defined in a logical layer, even if optical disks have the same recording format and the same file format, different operations (executable processing operations) may be performed due to a difference in the versions. Thus, even if the type of disk and the type of recording format are displayed on a screen, operations of a digital video camera may not be accurately presented.

For example, although the camera-integrated recorder disclosed in Japanese Unexamined Patent Application Publication No. 2004-206824 indicates the type of disk and the type of recording format, accurate information may not be presented to users since version information is not indicated.

More specifically, the "+VR mode" includes version 1.2 and version 2.0. Static images cannot be recorded in version 1.2. In contrast, static images can be recorded in version 2.0. Accordingly, a different operation may be performed depending on the version of a recording format. The camera-integrated recorder does not accurately indicate the difference in the version of the recording format.

It is desirable to accurately report to a user processing that is executable using an installed optical disk.

A recording apparatus according to an embodiment of the present invention includes first identification means for identifying, in accordance with information read from a disk medium and related to a format of data recorded on the disk medium, the format defined from a purpose of the data recorded on the disk medium and a version of the format; storage means for storing data in which the version of the format and information on whether processing that can be executed in the apparatus is executable or not are associated with each other; determination means for determining, in accordance with the identified version and by referring to the data stored in the storage means, whether processing that can be executed using the disk medium is limited or not; generation means for generating first image data for displaying a first image representing that the processing that can be executed using the disk medium is limited when the determination means determines that the processing that can be executed is limited; and display control means for controlling display of the first image in accordance with the generated first image data.

The recording apparatus may further include second identification means for identifying a type of the disk medium defined based on a physical characteristic of the disk medium in accordance with a profile read from the disk medium. The generation means may generate second image data for displaying a second image for identifying the type of the disk medium. The display control means may control display of the second image in accordance with the second image data.

When the determination means determines that the processing that can be executed is not limited, the generation means may generate second image data for displaying a second image representing that all the processing that can be executed using the disk medium is executable. The display control means may control display of the second image in accordance with the generated second image data.

A recording method according to an embodiment of the present invention includes the steps of identifying, in accordance with information read from a disk medium and related to a format of data recorded on the disk medium, the format defined from a purpose of the data recorded on the disk medium and a version of the format; storing data in which the version of the format and information on whether processing that can be executed in the apparatus is executable or not are associated with each other; determining, in accordance with the identified version and by referring to the data stored by the storing step, whether processing that can be executed using the disk medium is limited or not; generating first image data for displaying a first image representing that the processing that can be executed using the disk medium is limited when the determining step determines that the processing that can be executed is limited; and controlling display of the first image in accordance with the generated first image data.

A program of a recording medium according to an embodiment of the present invention includes the steps of identifying, in accordance with information read from a disk medium and related to a format of data recorded on the disk medium, the format defined from a purpose of the data recorded on the disk medium and a version of the format; storing data in which the version of the format and information on whether processing that can be executed in the apparatus is executable or not are associated with each other; determining, in accordance with the identified version and by referring to the data stored by the storing step, whether processing that can be executed using the disk medium is limited or not; generating first image data for displaying a first image representing that the processing that can be executed using the disk medium is limited when the determining step determines that the processing that can be executed is limited; and controlling display of the first image in accordance with the generated first image data.

A program according to an embodiment of the present invention includes the steps of identifying, in accordance with information read from a disk medium and related to a format of data recorded on the disk medium, the format defined from a purpose of the data recorded on the disk medium and a version of the format; storing data in which the version of the format and information on whether processing that can be executed in the apparatus is executable or not are associated with each other; determining, in accordance with the identified version and by referring to the data stored by the storing step, whether processing that can be executed using the disk medium is limited or not; generating first image data for displaying a first image representing that the processing that can be executed using the disk medium is limited when the determining step determines that the processing that can be executed is limited; and controlling display of the first image in accordance with the generated first image data.

In the foregoing recording apparatus, recording method, recording medium, and program, in accordance with information read from a disk medium and related to a format of data recorded on the disk medium, the format defined from a purpose of the data recorded on the disk medium and a version of the format are identified, and data in which the version of the format and information on whether processing that can be executed in the apparatus is executable or not are associated with each other is stored. Then, it is determined whether processing that can be executed using the disk medium is limited or not in accordance with the identified version and by referring to the stored data. If it is determined that the processing that can be executed is limited, first image data for displaying a first image representing that the processing that can be executed using the disk medium is limited is generated, and display of the first image is controlled in accordance with the generated first image data.

Accordingly, processing that can be executed using an installed optical disk can be reported to users more accurately, and operations can be performed more reliably.

BRIEF DESCRIPTION OF THE DRAWINGS

FIG. 10 shows another example of the structure of the digital video camera.

DESCRIPTION OF THE PREFERRED EMBODIMENTS

Figure 1:
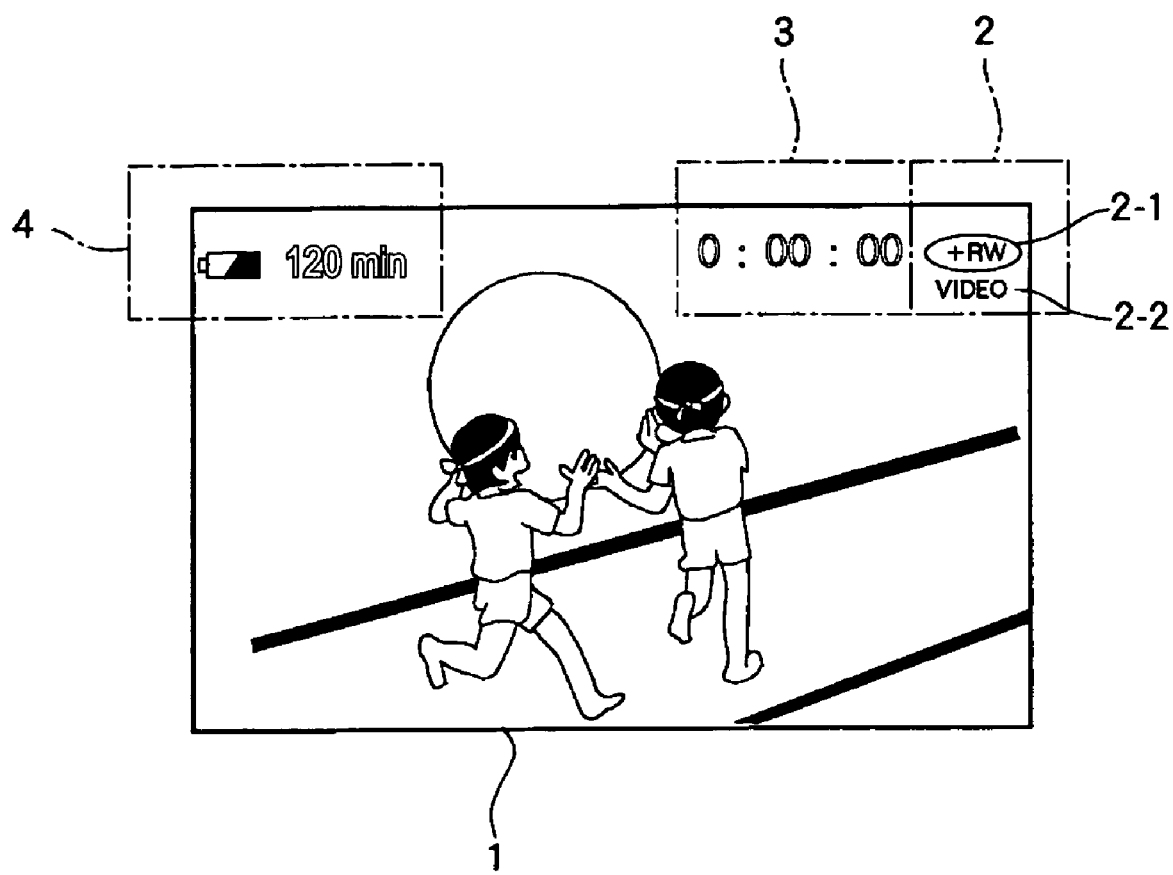
FIG. 1 shows a display unit for displaying a screen of a known digital video camera.

Before describing preferred embodiments of the present invention, the correspondence between an aspect of the present invention and an embodiment will be discussed below. Even if an embodiment described in this specification is not described here as relating to an aspect of the present invention, this does not mean that the embodiment does not relate to that aspect of the present invention. In contrast, even if an embodiment is described here as relating to an aspect of the present invention, this does not mean that the embodiment does not relate to other aspects of the present invention.

Furthermore, this description should not be construed as restricting that all the aspects of the present invention described in this specification are described. In other words, this description does not preclude the existence of aspects of the present invention that are described in this specification but that are not claimed in this application, in other words, does not preclude the existence of aspects of the present invention claimed by a divisional application or added by amendment in the future.

According to an embodiment of the present invention, a recording apparatus is provided. The recording apparatus includes first identification means (for example, a format identification section 112 in FIG. 3) for identifying, in accordance with information (for example, disk information) read from a disk medium and related to a format of data recorded on the disk medium, the format defined from a purpose of the data recorded on the disk medium and a version of the format; storage means (for example, an apparatus support information storage section 114 in FIG. 3) for storing data in which the version of the format and information (for example, apparatus support information) on whether processing that can be executed in the apparatus is executable or not are associated with each other; determination means (for example, a version determination section 113 in FIG. 3) for determining, in accordance with the identified version and by referring to the data stored in the storage means, whether processing that can be executed using the disk medium is limited or not; generation means (for example, a GUI generator 27 in FIG. 2) for generating first image data for displaying a first image representing that the processing that can be executed using the disk medium is limited when the determination means determines that the processing that can be executed is limited; and display control means (for example, an output controller 28 in FIG. 2) for controlling display of the first image in accordance with the generated first image data.

In addition, the recording apparatus may further include second identification means (for example, a disk type identification section 111 in FIG. 3) for identifying a type of the disk medium defined based on a physical characteristic of the disk medium in accordance with a profile read from the disk medium. The generation means may generate second image data for displaying a second image for identifying the type of the disk medium. The display control means may control display of the second image in accordance with the second image data.

When the determination means determines that the processing that can be executed is not limited, the generation means may generate second image data for displaying a second image representing that all the processing that can be executed using the disk medium is executable. The display control means may control display of the second image in accordance with the generated second image data.

According to the present invention, a recording method is provided. The recording method includes the steps of identifying (for example, processing in step S15 in FIG. 4), in accordance with information read from a disk medium and related to a format of data recorded on the disk medium, the format defined from a purpose of the data recorded on the disk medium and a version of the format; storing (for example, processing in step S16 in FIG. 4) data in which the version of the format and information on whether processing that can be executed in the apparatus is executable or not are associated with each other; determining (for example, processing in step S17 in FIG. 4), in accordance with the identified version and by referring to the data stored by the storing step, whether processing that can be executed using the disk medium is limited or not; generating (for example, processing in step S20 in FIG. 4) first image data for displaying a first image representing that the processing that can be executed using the disk medium is limited when the determining step determines that the processing that can be executed is limited; and controlling (for example, processing in step S21 in FIG. 4) display of the first image in accordance with the generated first image data.

According to the present invention, a program is provided. The program includes the steps of identifying (for example, processing in step S15 in FIG. 4), in accordance with information read from a disk medium and related to a format of data recorded on the disk medium, the format defined from a purpose of the data recorded on the disk medium and a version of the format; storing (for example, processing in step S16 in FIG. 4) data in which the version of the format and information on whether processing that can be executed in the apparatus is executable or not are associated with each other; determining (for example, processing in step S17 in FIG. 4), in accordance with the identified version and by referring to the data stored by the storing step, whether processing that can be executed using the disk medium is limited or not; generating (for example, processing in step S20 in FIG. 4) first image data for displaying a first image representing that the processing that can be executed using the disk medium is limited when the determining step determines that the processing that can be executed is limited; and controlling (for example, processing in step S21 in FIG. 4) display of the first image in accordance with the generated first image data.

The program can be stored on a storage medium (for example, a magnetic disk 331 in FIG. 10).

Embodiments of the present invention will be described with reference to the drawings.

Figure 2:
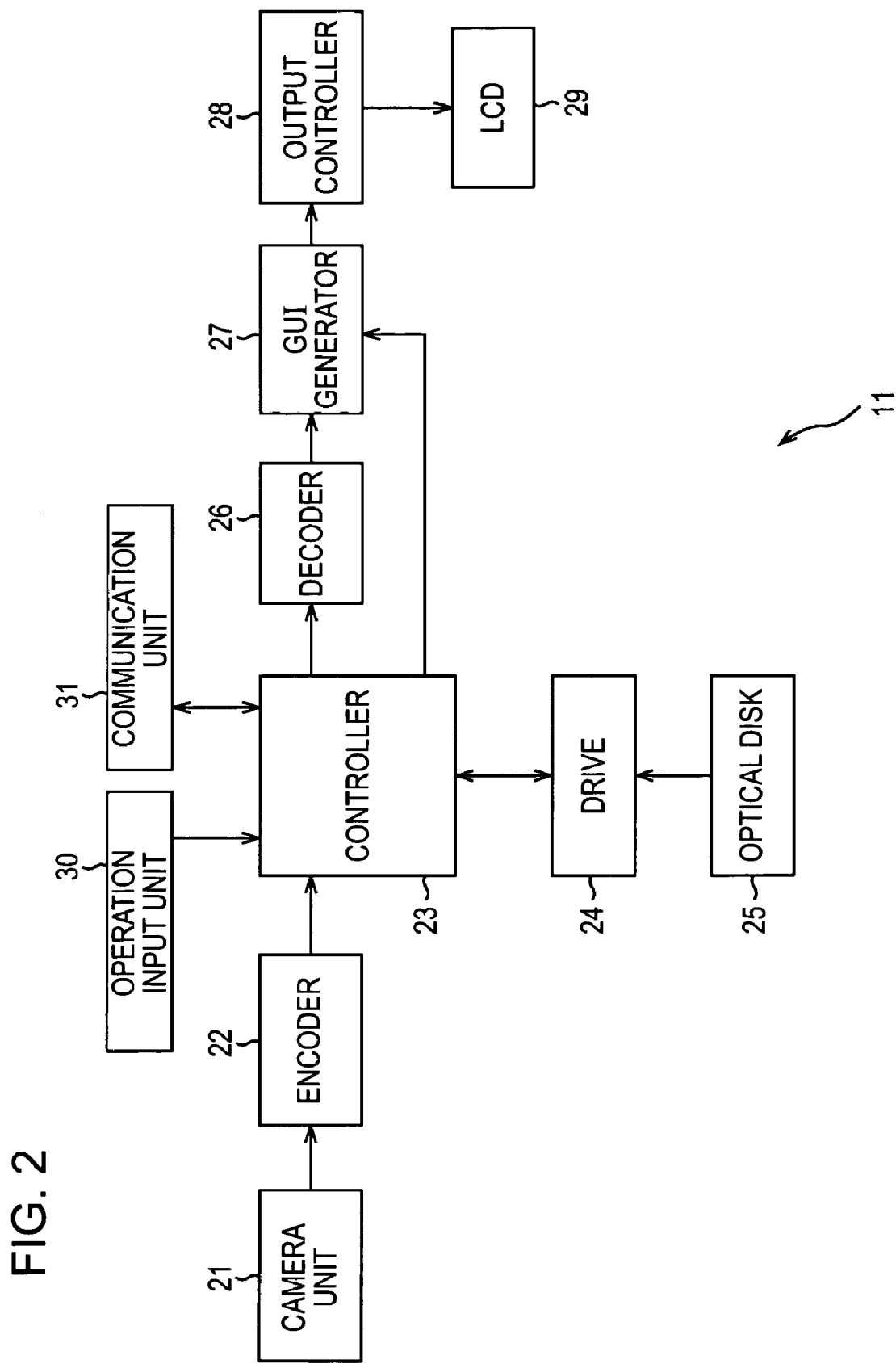
FIG. 2 is a block diagram showing the structure of a digital video camera according to an embodiment of the present invention.

FIG. 2 is a block diagram showing the structure of a digital video camera 11 according to an embodiment of the present invention.

The digital video camera 11 is an example of a recording apparatus for driving an optical disk and recording data. The digital video camera 11 is, for example, a camcorder (camera-integrated recorder).

A camera unit 21 includes a charge-coupled device (CCD) sensor or the like. The camera unit 21 captures light from an object (not shown), and supplies to an encoder 22 image data corresponding to an image of the object. An image pickup device forming the camera unit 21 is not necessarily a CCD sensor. For example, a device for generating a signal of an image for each pixel, such as a complementary metal-oxide semiconductor (CMOS) sensor, may be used as an image pickup device.

The encoder 22 encodes the image data supplied from the camera unit 21 into, for example, a Moving Picture Experts Group (MPEG) 2 format. Although not illustrated, in the digital video camera 11, sound data captured via a microphone is encoded by an audio encoder, and processed similarly to processing for image data.

A controller 23 controls the entire digital video camera 11.

The controller 23 acquires the encoded image data supplied from the encoder 22, and supplies the acquired image data to a drive 24. The controller 23 also supplies to a decoder 26 the image data supplied from the drive 24.

In accordance with a disk profile in which information including the type of an optical disk 25 supplied from the drive 24 is recorded, the controller 23 identifies the type of disk, which is an element defined in a physical layer of the optical disk 25, and supplies the identified disk type to a graphical user interface (GUI) generator 27.

In addition, in accordance with information representing the recording format of the optical disk 25 supplied from the drive 24 and the version of the recording format (hereinafter, referred to as disk information), the controller 23 identifies the type of recording format, which is an element defined in an application layer of the optical disk 25, and the version of the recording format.

The controller 23 also determines whether or not processing executable by the digital video camera 11 is limited, generates information on determination of whether or not processing executable by the digital video camera 11 is limited (hereinafter, referred to as version determination information) in accordance with the determination result, and supplies the generated version determination information to the GUI generator 27.

In addition, the controller 23 includes a memory (not shown). The controller 23 loads to the memory a program supplied from a communication unit 31 via a network (not shown) or loads to the memory a program supplied from the drive 24, and performs various types of processing in accordance with the program loaded to the memory. In addition, the controller 23 controls the entire digital video camera 11 on the basis of a signal supplied from an operation input unit 30 in accordance with a user operation.

Data and the like necessary for the controller 23 to perform the various types of processing are also appropriately stored in the memory of the controller 23.

The drive 24 records the image data supplied from the controller 23 on the installed optical disk 25 in accordance with a control signal supplied from the controller 23.

When the optical disk 25 is installed in the drive 24, the drive 24 measures the reflectance of the optical disk 25, and performs servo control. At this time, the drive 24 reads from the optical disk 25 the disk profile in which the information including the type of the optical disk 25 is recorded, and supplies the read disk profile to the controller 23. In addition, the drive 24 reads from the optical disk 25 the disk information including the recording format of the optical disk 25 and image data, and supplies the read disk information and image data to the controller 23.

More specifically, the disk profile includes, for example, "BookType" representing a media type (the type of disk), such as "DVD-R", "DVD-RW", or "DVD+RW", and "Part Version" representing a version, such as "Ver1.0" or "Ver2.0". In addition, disk information includes, for example, a recording format, such as a "video mode", a "VR mode", or a "+VR mode", and the version of the recording format, such as "ver1.0" or "Ver2.0".

The optical disk 25 is, for example, a DVD, which is a high-capacity optical disk. The system structure of the optical disk 25 is defined based on hierarchy, such as a physical-layer defining a physical format for storing data, a logical layer defining a logical file format storing data, and an application layer defining a recording format determined by recorded data, such as a set of moving images and sound, only sound, or data to be processed by a computer. The logical file format defines a logical system of a file in a so-called file system. The recording format in the application layer defines a specific arrangement of, for example, a data set of moving images and sound, data of only sound, or data to be processed by a computer stored in a file of a file system determined by the logical file format.

The optical disk 25 is an example of a recording medium. The optical disk 25 may be a recording medium of any type as long as it records data in accordance with a chemical or physical change and it is mechanically driven for playback.

The decoder 26 decodes the image data supplied from the controller 23, and supplies the decoded image data to the GUI generator 27.

The GUI generator 27 generates an icon representing a recording format to be superimposed on the image data in accordance with the version determination information supplied from the controller 23. In addition, the GUI generator 27 generates an icon representing the type of disk to be superimposed on the image data in accordance with the type of disk supplied from the controller 23.

The GUI generator 27 superimposes the generated icons representing the recording format and the type of disk on the image data supplied from the decoder 26, and supplies to an output controller 28 the image data on which the icons are superimposed.

Such icons are not necessarily generated by the GUI generator 27. For example, the icons may be stored in advance in a read-only memory (ROM) (not shown) of the controller 23 and may be appropriately read.

In other words, the GUI generator 27 may read an icon from the ROM (not shown) of the controller 23 in accordance with the version determination information supplied from the controller 23 and may superimpose the read icon on the image data supplied from the decoder 26. In addition, similarly, the GUI generator 27 may read an icon from the ROM (not shown) of the controller 23 in accordance with the type of disk supplied from the controller 23 and may superimpose the read icon on the image data supplied from the decoder 26.

In addition, image data to be superimposed by the GUI generator 27 on the image data supplied from the decoder 26 is not necessarily an icon. For example, the image data to be superimposed may be an image (data), such as a character, or an image (data) to be displayed as an on-screen display (OSD).

The output controller 28 causes the image data on which the character or the icon supplied from the GUI generator 27 is superimposed to be displayed on a liquid crystal device (LCD) 29 or on a display apparatus (not shown) connected via a terminal (not shown).

The operation input unit 30 includes an input device, such as an arrow key or a touch panel for inputting an operation command from a user. The operation input unit 30 supplies to the controller 23 an operation signal corresponding to the user operation.

The communication unit 31 performs communication with another apparatus (not shown) via a network (not shown).

Figure 3:
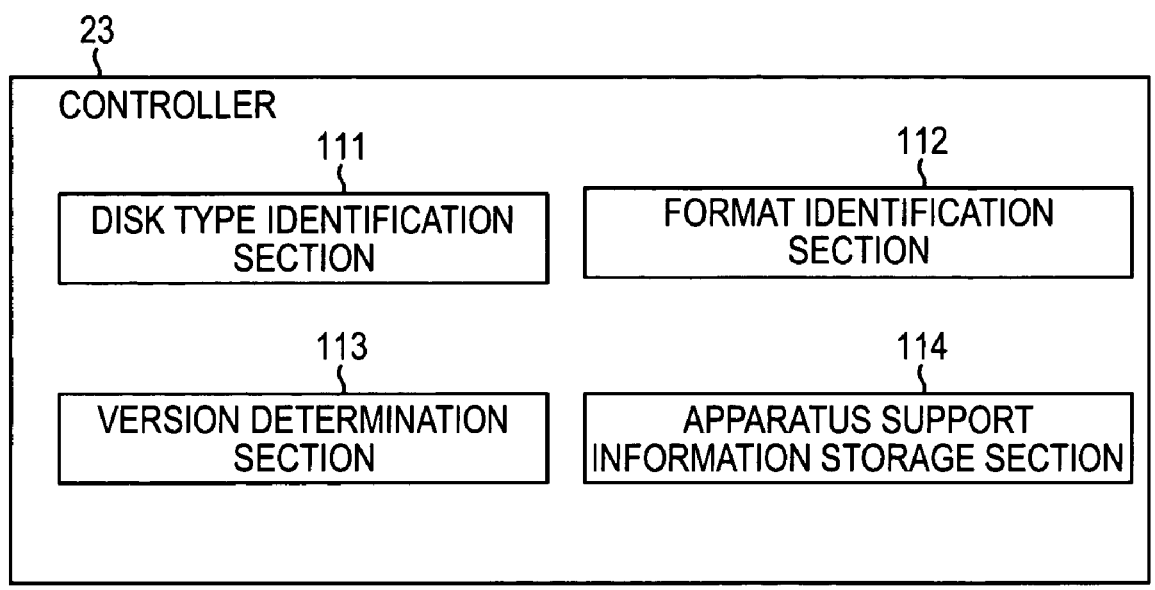
FIG. 3 shows an example of the detailed structure of a controller.

FIG. 3 shows an example of the detailed structure of the controller 23.

For example, the controller 23 performs processing for identifying the recording format of the optical disk 25 and processing for determining whether or not processing executable by the digital video camera 11 is limited.

The controller 23 includes a disk type identification section 111, a format identification section 112, a version determination section 113, and an apparatus support information storage section 114.

The disk type identification section 111 identifies the type of disk defined in the physical layer of the installed optical disk 25 in accordance with a disk profile supplied from the drive 24, and supplies the identified type of disk to the GUI generator 27.

For example, in accordance with a disk profile supplied from the drive 24, the disk type identification section 111 identifies that the disk type of the installed optical disk 25 is "DVD+RW" from among "DVD-R", "DVD-RW", and "DVD+RW" defined in the physical layer of optical disks. Then, the disk type identification section 111 supplies the identified disk type, which is "DVD+RW", to the GUI generator 27.

The format identification section 112 identifies a recording format, which is an element in the application layer of the installed optical disk 25, and the version of the recording format in accordance with disk information supplied from the drive 24. The format identification section 112 supplies the identified recording format and the identified version of the recording format to the version determination section 113.

For example, in accordance with disk information supplied from the drive 24, the format identification section 112 identifies that a recording format, which is an element in the application layer of the installed optical disk 25, is a "+VR mode" and that the version of the recording format (that is, the version of the "+VR mode") is "Ver1.2". Then, the format identification section 112 supplies to the version determination section 113 the identified recording format, which is the "+VR mode", and the identified version, which is "Ver1.2".

The version determination section 113 determines whether or not processing executable by the digital video camera 11 is limited in accordance with the version of the recording format supplied from the format identification section 112, the version of the recording format supported by the digital video camera 11 stored in the ROM (not shown) of the controller 23, and unique information on a function provided with the digital video camera 11 (hereinafter, referred to as apparatus support information) acquired from the apparatus support information storage section 114.

For example, the version determination section 113 determines whether or not the version of the recording format supplied from the format identification section 112 is older than the version of the recording format supported by the digital video camera 11 stored in the ROM of the controller 23. In addition, the version determination section 113 determines whether or not processing executable by the digital video camera 11 is limited in accordance with the apparatus support information acquired from the apparatus support information storage section 114.

If it is determined that processing executable by the digital video camera 11 is limited, the version determination section 113 generates version determination information representing that executable processing is limited, and supplies the generated version determination information to the GUI generator 27. If it is determined that processing executable by the digital video camera 11 is not limited, the version determination section 113 generates version determination information representing that all the executable processing can be processed, and supplies the generated version determination information to the GUI generator 27.

The apparatus support information storage section 114 stores apparatus support information, which is unique information on a function provided with the digital video camera 11, and supplies the stored apparatus support information to the version determination section 113.

For example, apparatus support information represents that the digital video camera 11 is capable of recording moving images and/or static images. The apparatus support information represents a function provided with an apparatus. For example, apparatus support information represents that a digital video camera is capable of recording both moving images and static images. For example, apparatus support information represents that a digital video camera is capable of recording only moving images.

In other words, apparatus support information is set when, even for the same type of digital video cameras, digital video cameras of a particular model are capable of executing all the functions and digital video cameras of the other models are capable of executing a limited function.

In addition, as described above, the recording operation (executable processing) of the digital video camera 11 is different depending on the version of the recording format defined in the application layer of the optical disk 25. A process performed by the digital video camera 11 for presenting to a user that the recording operation is different depending the version is described next with reference to FIGS. 4 to 9.

A process of display control will now be described with reference to a flowchart shown in FIG. 4.

In step S11, the drive 24 determines, under the control of the controller 23, whether or not the optical disk 25 is installed by the user.

If it is determined in step S11 that the optical disk 25 is not installed, the processing in step S11 is repeated. In other words, the drive 24 waits until the optical disk 25 is installed by the user.

If it is determined in step S11 that the optical disk 25 is installed, the process proceeds to step S12. In step S12, the drive 24 measures the reflectance of the installed optical disk 25, and performs servo control. At this time, the drive 24 reads a disk profile from the installed optical disk 25, and supplies the read disk profile to the controller 23.

In step S13, the disk type identification section 111 identifies the type-of disk defined in the physical layer of the installed optical disk 25 in accordance with the disk profile supplied from the drive 24, and supplies the identified type of disk to the GUI generator 27.

For example, in step S13, in accordance with the disk profile supplied from the drive 24, the disk type identification section 111 identifies that the disk type of the installed optical disk 25 is "DVD+RW" from among "DVD-R", "DVD-RW", and "DVD+RW" defined in the physical layer of optical disks. Then, the disk type identification section 111 supplies the identified disk type, which is "DVD+RW", to the GUI generator 27.

In step S14, the drive 24 reads disk information and image data recorded in the installed optical disk 25, and supplies the read disk information and image data to the controller 23. Then, the controller 23 supplies to the decoder 26 the image data supplied from the drive 24. The decoder 26 decodes the image data supplied from the controller 23, and supplies the decoded image data to the GUI generator 27.

For example, in step S14, the drive 24 reads disk information representing that a recording format is a "+VR mode" and that the version of the recording format is "Ver1.2" and image data that are recorded in the installed optical disk 25, and supplies the read disk information and image data to the controller 23.

In step S15, in accordance with the disk information supplied from the drive 24, the format identification section 112 identifies the recording format, which is an element in the application layer of the installed optical disk 25, and the version of the recording format. The format identification section 112 supplies the identified recording format and the identified version of the recording format to the version determination section 113.

For example, in step S15, in accordance with the disk information supplied from the drive 24, the format identification section 112 identifies that the recording format, which is the element in the application layer of the installed optical disk 25, is the "+VR mode" and that the version of the recording format (that is, the version of the "+VR mode") is "Ver1.2". Then, the format identification section 112 supplies to the version determination section 113 the identified recording format, which is the "+VR mode", and the identified version, which is "Ver1.2".

In step S16, the version determination section 113 acquires from the apparatus support information storage section 114 apparatus support information representing a function provided with the digital video camera 11.

For example, in step S16, the version determination section 113 acquires from the apparatus support information storage section 114 apparatus support information representing that the digital video camera 11 is capable of recording moving images and static images.

In step S17, the version determination section 113 determines whether or not processing executable by the digital video camera 11 is limited in accordance with the version of the recording format supplied from the format identification section 112, the version of the recording format supported by the digital video camera 11 stored in the ROM of the controller 23, and the apparatus support information acquired from the apparatus support information storage section 114.

As described above, since a version is defined for a recording format defined in the application layer of the optical disk 25, even for the same type of recording format, a permitted operation (executable processing) may be different depending on the version. For example, if the recording format is the "+VR mode", the recording operation may be different depending on the version of the recording format.

Figures 5, 6:
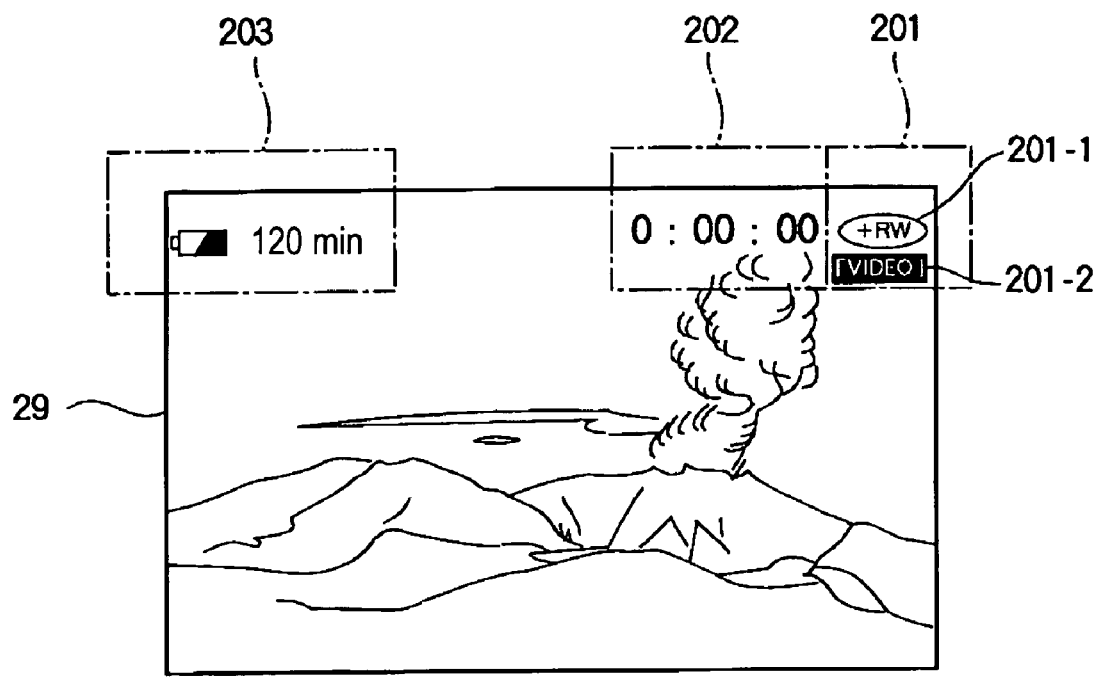
FIG. 5 shows whether or not a recording operation can be performed in accordance with a combination of a version of a recording format defined in an application layer and the recording operation.
FIG. 6 shows an LCD for displaying a screen of a digital video camera according to an embodiment of the present invention.

FIG. 5 shows whether or not a recording operation can be performed in accordance with a combination of a version of the recording format "+VR mode" defined in the application layer of an optical disk and the recording operation of the digital video camera 11.

In the example shown in FIG. 5, versions (Ver1.2 and Ver2.0) of the recording format defined in the application layer are shown in the first line, and recording operations (moving image recording and static image recording) of the digital video camera 11 are shown in the first column. In other words, the example shown in FIG. 5 represents that the recording operation of the digital video camera 11 is different depending on the version of the recording format "+VR mode" of the "DVD+RW" optical disk.

In the example shown in FIG. 5, the word "YES" represents that a recording operation can be performed, and the word "NO" represents that a recording operation cannot be performed.

In FIG. 5, the word "YES" in the second column from the left and in the second line from the top represents that when the version of the recording format "+VR mode" is "Ver1.2", a moving image can be recorded. In addition, the word "YES" in the third column from the left and in the second line from the top represents that when the version of the recording format "+VR mode" is "Ver2.0", a moving image can be recorded.

Moreover, the word "NO" in the second column from the left and in the third line from the top represents that when the version of the recording format "+VR mode" is "Ver1.2", a static image cannot be recorded. In addition, the word "YES" in the third column from the left and in the third line from the top represents that when the version of the recording format "+VR mode" is "Ver2.0", a static image can be recorded.

In other words, the "+VR mode" includes "Ver1.2" (version 1.2) and "Ver2.0" (version 2.0). Although static images cannot-be recorded in version 1.2, static images can be recorded in version 2.0. In other words, an operation is different depending on the version of the recording format.

For example, in a case where a digital video camera supporting-version 2.0 of the "+VR mode" has functions to record moving images and to record static images, when an optical disk recorded by a digital video camera supporting version 1.2 of the "+VR mode" is installed in the digital video camera supporting version 2.0 of the "+VR mode" and data is recorded on the installed optical disk, since the data was recorded in version 1.2 of the "+VR mode", even if a user tries to record a static image by the digital video camera supporting version 2.0 of the "+VR mode", the static image cannot be recorded.

The digital video camera 11 is capable of allowing the user to identify that an executable processing is different by causing the version determination section 113 to determine whether or not the version of the recording format supplied from the format identification section 112 is older than the version of the recording format supported by the digital video camera 11 stored in the ROM of the controller 23 and to report to the GUI generator 27 that a permitted operation is different depending on the version of the recording format in accordance with version determination information.

Figure 4:
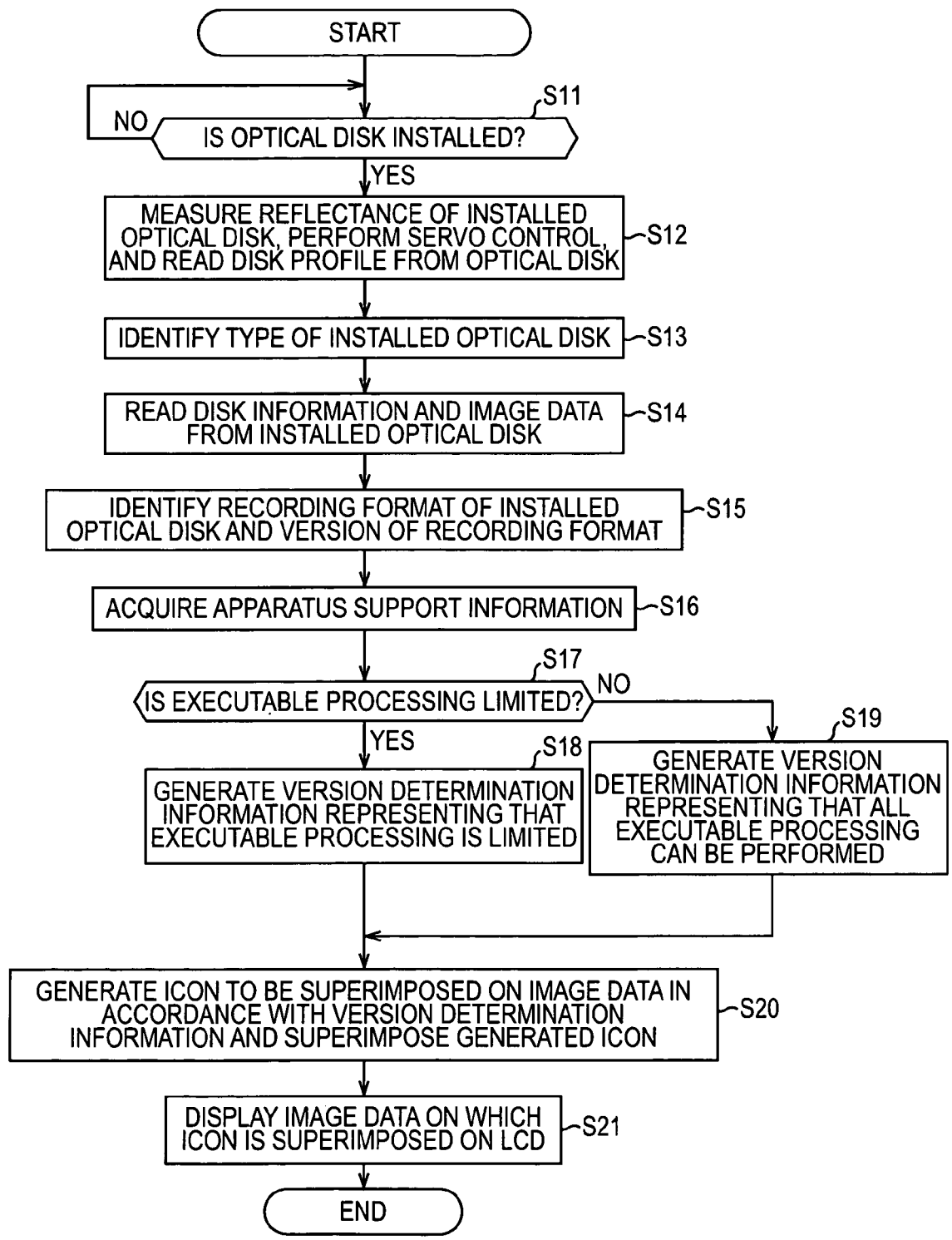
FIG. 4 is a flowchart of a process for display control.

Referring back to the flowchart shown in FIG. 4, for example, in step S17, the version determination section 113 determines whether or not the version of the recording format supplied from the format identification section 112 is older than the version of the recording format supported by-the digital video camera 11 stored in the ROM of the controller 23. In addition, the version determination section 113 determines whether or not processing executable by the digital video camera 11 is limited in accordance with the apparatus support information acquired from the apparatus support information storage section 114.

As described above, for example, the version determination section 113 determines whether or not processing executable by the digital video camera 11 is limited by determining whether or not the version of the recording format of the optical disk 25 is older than the version supported by the digital video camera 11 and by determining whether or not the apparatus support information represents that processing executable by the digital video camera 11 is limited.

The example shown in FIG. 5 may be stored as a table in the ROM (not shown) of the controller 23, and the version determination section 113 may determine whether or not processing executable by the digital video camera 11 is limited in accordance with the table.

If it is determined in step S17 that processing executable by the digital video camera 11 is limited, the process proceeds to step S18. In step S18, the version determination section 113 generates version determination information representing that executable processing is limited, and supplies the generated version determination information to the GUI generator 27.

For example, when the version of the "+VR mode" supplied from the format identification section 112 is "Ver1.2", the version of the "+VR mode" supported by the digital video camera 11 is "Ver2.0", and the digital video camera 11 is capable of dealing with static and moving images, even if the digital video camera 11 is capable of dealing with static and moving images, since the version of the recording-format of the optical disk 25 is older than the version supported by the digital video camera 11, static images cannot be recorded (that is, executable processing is limited). Thus, in step S18, the version determination section 113 generates version determination information representing that executable processing is limited, and supplies the generated version determination information to the GUI generator 27.

For example, when the version of the "+VR mode" supplied from the format identification section 112 is "Ver2.0", the version of the "+VR mode" supported by the digital video camera 11 is "Ver2.0", and the digital video camera 11 is capable of dealing with only moving images, even if the same version "Ver2.0" is determined, the digital video camera 11 is not capable of dealing with static images (that is, executable processing is limited). Thus, in step S18, the version determination section 113 generates version determination information representing that executable processing is limited, and supplies the generated version determination information to the GUI generator 27.

In contrast, if it is determined in step S17 that processing executable by the digital video camera 11 is not limited, the process proceeds to step S19. In step S19, the version determination section 113 generates version determination information representing that all the executable processing can be executed, and supplies the generated version determination information to the GUI generator 27.

For example, when the version of the "+VR mode" supplied from the format identification section 112 is "Ver2.0", the version of the "+VR mode" supported by the digital video camera 11 is "Ver2.0", and the digital video camera 11 is capable of dealing with static and moving images, the digital video camera 11 is capable of dealing with both static and moving images and the version "Ver2.0" is not older than the version "Ver2.0" (that is, all the executable processing can be executed). Thus, the version determination section 113 generates version determination information representing that all the executable processing can be executed, and supplies the generated version determination information to the GUI generator 27.

In step S20, in accordance with the version determination information supplied from the version determination section 113, the GUI generator 27 generates icons to be superimposed on image data.

For example, in step S20, in accordance with the version determination information supplied from the version determination section 113 and representing that executable processing is limited, the GUI generator 27 generates an icon representing that executable processing is limited (for example, a recording format icon 201-2 shown in FIG. 6). Alternatively, for example, in step S20, in accordance with the version determination information supplied from the version determination section 113 and representing that all the executable processing can be executed, the GUI generator 27 generates an icon representing that all the executable processing can be executed (for example, a recording format icon 201-3 shown in FIG. 7).

In addition, in step S20, in accordance with the type of disk supplied from the disk type identification section 111, the GUI generator 27 generates an icon to be superimposed on the image data.

For example, in step S20, in accordance with the type of disk, which is "DVD+RW", supplied from the disk type identification section 111, the GUI generator 27 generates an icon for presenting to the user that the type of disk is "DVD+RW" (for example, a media icon 201-1 shown in FIG. 6).

In addition, in step S20, the GUI generator 27 superimposes the generated icons (for example, the media icon 201-1 and the recording format icon 201-2 shown in FIG. 6) on the image data supplied from the decoder 26, and supplies to the output controller 28 the image data on which the icons (for example, the media icon 201-1 and the recording format icon 201-2 shown in FIG. 6) are superimposed.

In step S21, the output controller 28 causes the image data on which the icons supplied from the GUI generator 27 are superimposed to be displayed on the LCD 29, and the process ends.

For example, in step S21, the output controller 28 causes the screen shown in FIG. 6 to be displayed on the LCD 29 as image data on which the icons supplied from the GUI generator 27 and representing that executable processing is limited (for example, the media icon 201-1 and the recording format icon 201-2 shown in FIG. 6) are superimposed.

FIG. 6 shows the LCD 29 for displaying the screen of the digital video camera 11 when executable processing is limited.

On the upper right portion of the LCD 29 shown in FIG. 6 for displaying the screen of the digital video camera 11, the media icon 201-1 representing that the type of disk defined in the physical layer of the installed DVD (optical disk 25) is "+RW" (that is, "DVD+RW") and the recording format icon 201-2 representing that the type of recording format defined in the application layer is "VIDEO" (that is, a DVD+RW Video Recording format ("+VR mode")) are shown from the top in that order.

At this time, the recording format icon 201-2 is displayed as a characteristic icon in which the color of the word "VIDEO" is changed (for example, the recording format icon 201-2 shown in FIG. 6, which is the voided letters "VIDEO").

Accordingly, the user of the digital video camera 11 is able to identify that the installed DVD is rewritable, that is, the "DVD+RW" type, that the type of recording format defined in the application layer is "VIDEO", and that static images cannot be recorded since executable processing is limited by looking at an icon set 201 including the media icon 201-1 and the recording format icon 201-2.

A counter 202 representing that the elapsed recording time is 0:00:00, that is, recording is not performed, is shown on the left of the icon set 201. In addition, a remaining battery level 203 representing that the remaining battery time is 120 minutes is shown on the left of the counter 202.

Although a difference in the version of the recording format is presented to the user by changing the color of the recording format icon 201-2 in the foregoing embodiment, the difference in the version of the recording format may be presented by other methods. For example, the shape of the icon may be changed, the font of letters written on the icon may be changed, a message indicating that the version of the recording format is different (a message indicating that executable processing is limited) may be displayed on the LCD 29, a light-emitting diode (LED) (not shown) provided on the digital video camera 11 may be turned on, or sound may be provided by a sound emitting device (not shown) as long as it is a method for allowing the user to identify that processing executable by the digital video camera 11 is limited.

When all the executable processing can be executed, instead of the recording format icon 201-2 whose color is changed as shown in FIG. 6, an icon representing that static images can be recorded (icon whose color is not changed) may be displayed.

Figure 7:
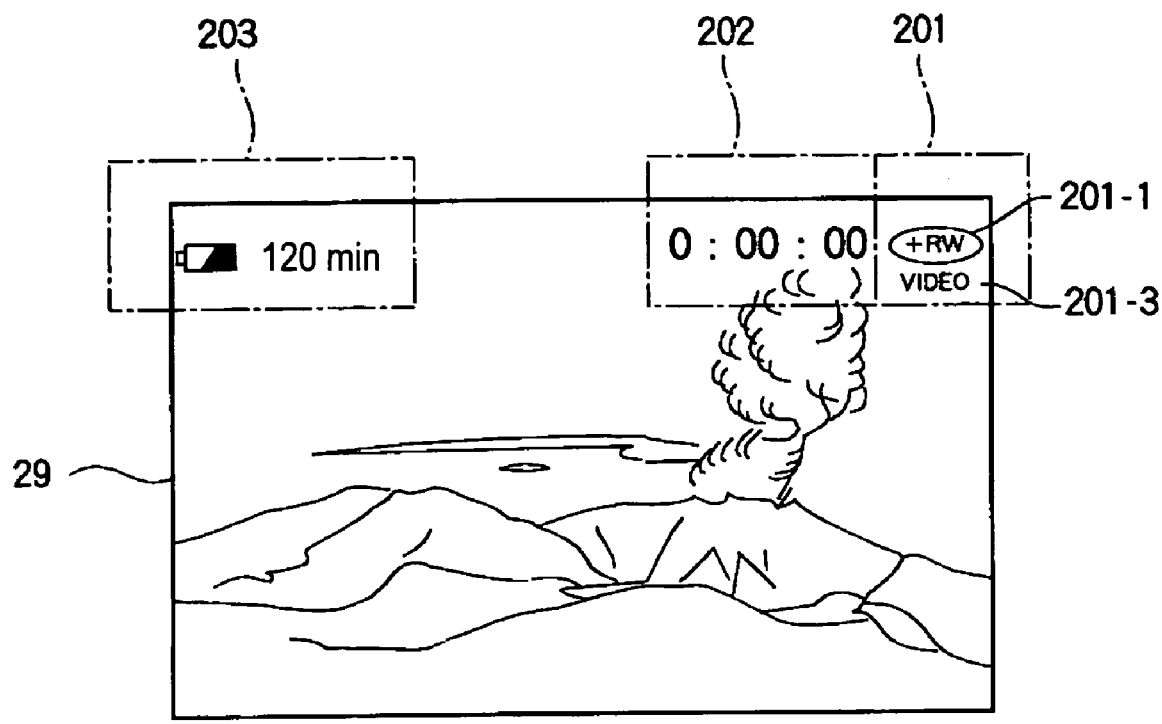
FIG. 7 shows the LCD for displaying a screen of the digital video camera according to the embodiment of the present invention.

FIG. 7 shows the LCD 29 for displaying a screen of the digital video camera 11 when all the executable processing can be executed. The same portions as in the case shown in FIG. 6 are referred to with the same reference numerals and the descriptions of those same parts will be omitted here in an appropriate fashion.

On the upper right portion of the LCD 29 shown in FIG. 7 for displaying the screen of the digital video camera 11, the media icon 201-1 representing that the type of disk defined in the physical layer of the installed DVD (optical disk 25) is "+RW" (that is, "DVD+RW") and the recording format icon 201-3 representing that the type of recording format defined in the application layer is "VIDEO" (that is, "+VR mode") are shown from the top in that order.

At this time, the recording format icon 201-3 is displayed as an icon representing that static images can be recorded (for example, the recording format icon 201-3 shown in FIG. 7, which is the letters "VIDEO").

Accordingly, the user of the digital video camera 11 is able to identify that the installed DVD is rewritable, that is, the "DVD+RW" type, that the type of recording format defined in the application layer is "VIDEO", and that static images can be recorded since all the executable processing can be executed by looking at the icon set 201 including the media icon 201-1 and the recording format icon 201-3.

In addition, although the optical disk 25 in which the type of disk defined in the physical layer is "DVD+RW" and in which the type of recording format defined in the application layer is "VIDEO" (that is, DVD+RW Video format ("+VR mode")) is described in the foregoing embodiment, an optical disk used in the present invention is not limited to this. For example, an optical disk in which the type of disk is "DVD-RW" and in which the recording format is a "VR mode" may be used.

Figure 8:
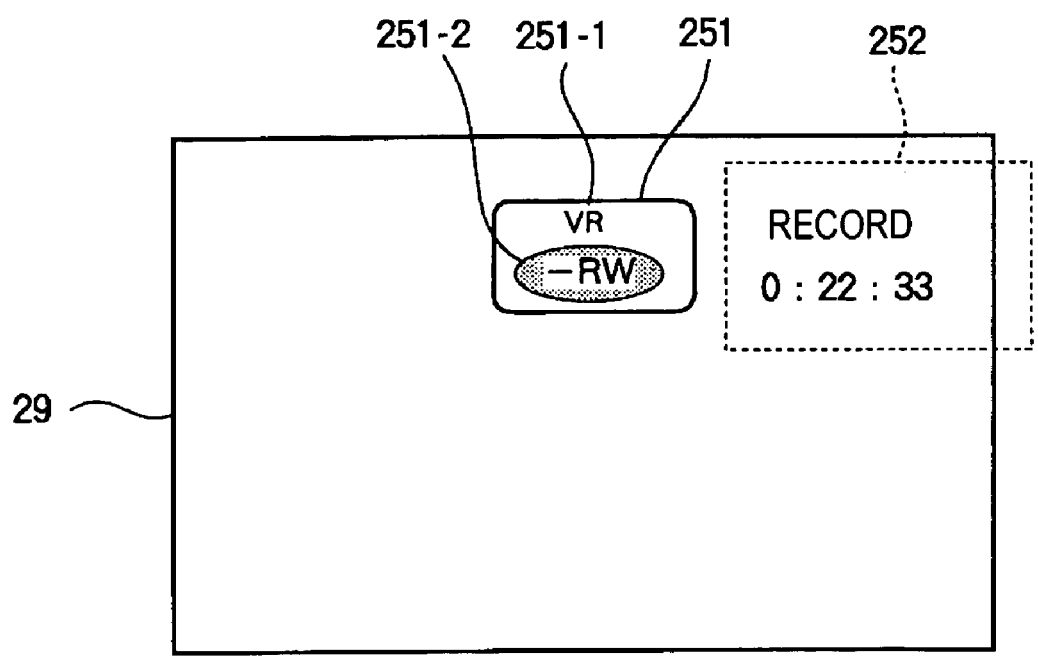
FIG. 8 shows the LCD for displaying a screen of the digital video camera according to another embodiment of the present invention.
Figure 9:
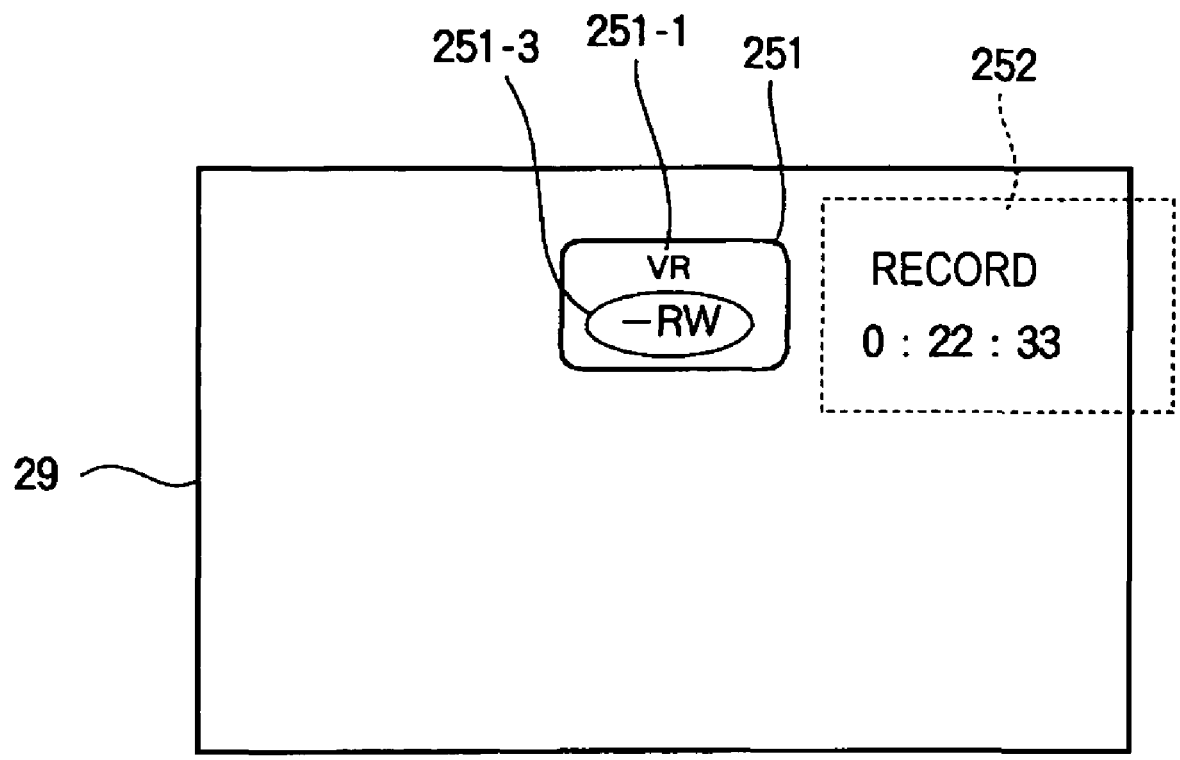
FIG. 9 shows the LCD for displaying a screen of the digital video camera according to the embodiment of the present invention.

In addition, although a difference in the version of the recording format is presented to the user by changing the color of an icon representing the recording format (for example, the recording format icon 201-2 in FIG. 6 or the recording format icon 201-3 in FIG. 7) in the example shown in FIG. 6 or 7, the color of an icon representing the type of disk (for example, the media icon 201-1 in FIG. 6 or 7) may be changed (for example, as shown by the screen shown in FIG. 8 or 9).

A case where a difference in the version of a recording format is presented to the user when an optical disk of another type is used will now be described with reference to FIGS. 8 and 9.

FIG. 8 shows the LCD 29 for displaying a screen of the digital video camera 11 when executable processing is limited.

On the top center portion of the LCD 29 shown in FIG. 8 for displaying the screen of the digital video camera 11, a media icon 251-2 representing that the type of disk defined in the physical layer of the installed DVD (optical disk 25) is "-RW" (that is, "DVD-RW") and a recording format icon 251-1 representing that the type of recording format defined in the application layer is "VR" (that is, a DVD Video Recording format ("VR mode") are shown from the bottom in that order.

At this time, the media icon 251-2 is displayed as an icon representing that executable processing is limited by changing the color of the letters "-RW" ("DVD-RW") (for example, the hatched oval media icon 251-2 in FIG. 8).

Accordingly, the user is able to identify that the installed DVD is rewritable, that is, the "DVD-RW" type, that the type of recording format defined in the application layer is "VR" (that is, a DVD Video Recording format ("VR mode"), and that executable processing is limited by looking at an icon set 251 including the recording format icon 251-1 and the media icon 251-2.

A counter 252 representing that the elapsed recording time is 0:22:33, that is, 22 minutes and 33 seconds have passed since recording started, is shown on the right of the table 251.

FIG. 9 shows the LCD 29 for displaying a screen of the digital video camera 11 when all the executable processing can be executed. The same portions as in the case shown in FIG. 8 are referred to with the same reference numerals and the descriptions of those same parts will be omitted here in an appropriate fashion.

On the top center portion of the LCD 29 shown in FIG. 9 for displaying the screen of the digital video camera 11, a media icon 251-3 representing that the type of disk defined in the physical layer of the installed DVD (optical disk 25) is "-RW" (that is, "DVD-RW") and the recording format icon 251-1 representing that the type of recording format defined in the application layer is "VR" (that is, a DVD Video Recording format ("VR mode")) are shown from the bottom in that order.

At this time, the media icon 251-3 is displayed as an icon representing that all the executable processing can be executed by not changing the color of the letters "-RW" ("DVD-RW") (for example, the oval icon 251-3 in FIG. 9).

Accordingly, the user is able to identify that the installed DVD is rewritable, that is, the "DVD-RW" type, that the type of recording format defined in the application layer is "VR" (that is, a DVD Video Recording format ("VR mode")), and that all the executable processing can be executed by looking at the icon set 251.

As described above, even for an optical disk in which the type of disk is "DVD-RW" and in which the recording format is the "VR mode", a difference in the operation (executable processing) depending on the version of a recording format can be presented on the screen.

A recording format for presenting a difference in the version on the screen is not necessarily the "VR mode" or the "+VR mode". Such a recording format may be a "video mode". In other words, the digital video camera 11 is capable of allowing the user to identify a difference in the version of each recording format of an optical disk of any type.

Although the arrangement of the icons and the counter on the screen shown in FIG. 8 or 9 is different from the arrangement of the icons and the counter on the screen shown in FIG. 6 or 7, such arrangements are merely examples of screen layout. Thus, the arrangement of icons and counters used in the present invention is not limited to them.

As described above, the digital video camera 11 is capable of more accurately providing to the user information on the optical disk 25 installed in the drive 24.

Although the versions "Ver1.2" and "Ver2.0" of a DVD+RW Video format ("+VR mode") are explained as examples of versions of a recording format in the foregoing embodiments, the versions are not necessarily limited to them. In addition, although a DVD is explained as an example of the optical disk 25 in the foregoing embodiments, the optical disk 25 is not necessarily limited to a DVD. The optical disk 25 may be, for example, an optical disk other than DVDs, such as a compact disk (CD) or a Blu-ray Disc™, hard disk drive (HDD), a flash memory, or a memory stick™.

In addition, processing performed when the version of a recording format defined in an application layer is different is described in the foregoing embodiments, this processing may also be applied to a case where the version of a file format defined in a logical layer is different.

For example, when the version of a file format "UDF" defined in the logical layer of the optical disk 25 is "Ver1.5" and the version of the file format "UDF" supported by the digital video camera 11 is "Ver2.0", the format identification section 112 identifies the version of the file format "UDF"

defined in the logical layer of the optical disk 25, and supplies the identified version to the version determination section 113.

In this case, the version determination section 113 determines whether or not the version of the file format supplied from the format identification section 112 is older than the version of the file format "UDF" supported by the digital video camera 11. Since the version "Ver1.5" is older than the version "Ver2.0", the version determination section 113 supplies to the GUI generator 27 version determination information representing that executable processing is limited. Accordingly, an icon whose color is changed is superimposed on image data.

Accordingly, even when the version of the file format defined in a logical layer is different, the user is able to identify that processing executable by the digital video camera 11 is limited by looking at the icon whose color is changed.

In addition, the foregoing series of processing may be performed by hardware or software. In this case, for example, the digital video camera 11 may be formed as a digital video camera 301 shown in FIG. 10.

Referring to FIG. 10, a central processing unit (CPU) 311 performs various types of processing in accordance with a program stored in a ROM 312 or a program loaded from a recording unit 319 to a random-access memory (RAM) 313. Data necessary-for the CPU 311 to perform the various types of processing is appropriately stored in the RAM 313.

The CPU 311, the ROM 312, and the RAM 313 are connected to each other via a bus 314. An input/output interface 315 is also connected to the bus 314.

The input/output interface 315 is connected to a camera unit 316 for capturing an image of an object, an input unit 317 including an arrow key or a touch panel; an output unit 318 including a display, such as an LCD, and a speaker; the recording unit 319; and a communication unit 320, such as a modem and a terminal adapter. The communication unit 320 performs communication via a network (not shown).

A drive 321 is connected to the input/output interface 315 according to need. A magnetic disk 331, an optical disk 332, a magneto-optical disk 333, or a semiconductor memory 334 is appropriately installed in the drive 321. A computer program read from the magnetic disk 331, the optical disk 332, the magneto-optical disk 333, or the semiconductor memory 334 is installed in the recording unit 319 according to need.

When the series of foregoing processing is performed by software, a program constituting the software is installed from a recording medium on a computer installed in dedicated hardware or, for example, a general-purpose personal computer that is capable of performing various functions by installing various programs.

The recording medium not only includes a package medium, such as the-magnetic disk 331 (including a flexible disk), the optical disk 332 (including a compact disk-read only memory (CD-ROM)), the magneto-optical disk 333 (including a MiniDisk (MD)), or the semiconductor memory 334, which records the program and is distributed in order to provide the program to a user independent of the computer, but also includes the ROM 312 and the recording unit 319 which record the program and are built in the computer to be provided to the user.

The program for performing the series of foregoing processing may be installed on the computer via wired or wireless communication, such as a local area network, the Internet, or digital broadcasting, using an interface, such as a router or a modem, according to need.

In this specification, steps for a program recorded in the recording medium are not necessarily performed in chronological order in accordance with the written order. The steps may be performed in parallel or independently without being performed in chronological order.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus for recording on an installed recording medium, the recording apparatus comprising:
    first identification means for identifying a format of data recorded on the recording medium and a version of the format, the format identifying a purpose of the data, the recording medium having recorded thereon the data and having hierarchically arranged therein a physical layer, a logical layer, and an application layer, wherein the format and the version of the format are identified from recording medium information read from the application layer of the recording medium;
    storage means for storing data in which the version of the format and feature information are associated with each other, wherein the feature information indicates processing functions that can be executed in the apparatus, and the association indicates whether the processing functions are executable with the corresponding version, the processing functions comprising moving image recording and static image recording;
    determination means for determining whether or not the processing functions that can be executed in the apparatus are limited based on the identified version, the data stored in the storage means, and whether the identified version is older than a version supported by the recording apparatus;
    generation means for:
        generating first image data for displaying a first image representing that only one of the moving image recording or the static image recording is executable, when the determination means determines that the processing functions that can be executed in the apparatus are limited; and
        generating second image data for displaying a second image representing that all the processing functions that can be executed in the apparatus are executable, when the determination means determines that the processing functions that can be executed in the apparatus are not limited; and
    display control means for controlling display of the first image or the second image in accordance with the generated first image data or the generated second image data.

2. The recording apparatus according to claim 1, further comprising:
    second identification means for identifying a type of the recording medium defined based on a physical characteristic of the recording medium in accordance with a profile read from the recording medium,
    wherein the generation means generates second image data for displaying a second image for identifying the type of the recording medium, and
    wherein the display control means controls display of the second image in accordance with the second image data.

3. A recording method for a recording apparatus for recording on an installed recording medium, the method comprising the steps of:

identifying a format of data recorded on the recording medium and a version of the format, the format identifying a purpose of the data, the recording medium having recorded thereon the data and having hierarchically arranged therein a physical layer, a logical layer, and an application layer, wherein the format and the version of the format are identified from recording medium information read from the application layer of the recording medium;

storing data in which the version of the format and feature information are associated with each other, wherein the feature information indicates processing functions that can be executed by the apparatus, and the association indicates whether the processing functions are executable with the corresponding version, the processing functions comprising moving image recording and static image recording;

determining whether or not the processing functions that can be executed in the apparatus are limited based on the identified version, the data stored in the storage step, and whether the identified version is older than a version supported by the recording apparatus;

generating first image data for displaying a first image representing that only one of the moving image recording or the static image recording is executable, when the determining step determines that the processing functions that can be executed in the apparatus are limited;

generating second image data for displaying a second image representing that all the processing functions that can be executed in the apparatus are executable, when the determining step determines that the processing functions that can be executed in the apparatus are not limited; and controlling display of the first image or the second image in accordance with the generated first image data or the generated second image data.

4. The recording method according to claim 3, further comprising:

identifying a type of the recording medium defined based on a physical characteristic of the recording medium in accordance with a profile read from the recording medium;

generating the second image data for displaying a second image for identifying the type of the recording medium; and displaying of the second image in accordance with the second image data.

5. The recording method according to claim 3, wherein:

generating the second image data for displaying a second image representing that all the processing that can be executed using the recording medium is executable, upon determination that the processing that can be executed is not limited; and displaying the second image in accordance with the generated second image data.

6. A non-transitory computer-readable medium storing program instructions, which, when executed by a processor, cause the processor to perform a method of recording processing for a recording apparatus for recording on an installed recording medium, the method comprising the steps of:

identifying a format of data recorded on the recording medium and a version of the format, the format identifying a purpose of the data, the recording medium having recorded thereon the data and having hierarchically arranged therein a physical layer, a logical layer, and an application layer, wherein the format and the version of the format are identified from recording medium information read from the application layer of the recording medium;

storing data in which the version of the format and feature information are associated with each other, wherein the feature information indicates processing functions that can be executed by the apparatus, and the association indicates whether the processing functions are executable with the corresponding version, the processing functions comprising moving image recording and the static image recording;

determining whether or not the processing functions that can be executed are limited based on the identified version, the data stored in the storage step, and whether the identified version is older than a version supported by the recording apparatus;

generating first image data for displaying a first image representing that only one of the moving image recording or the static image recording is executable, when the determining step determines that the processing functions that can be executed are limited;

generating second image data for displaying a second image representing that all the processing functions that can be executed in the apparatus are executable, when the determining step determines that the processing functions that can be executed in the apparatus are not limited; and controlling display of the first image or the second image in accordance with the generated first image data or the generated second image data.

7. A recording apparatus for recording on an installed recording medium, the recording apparatus comprising:

a first identification unit configured to identify a format of data recorded on the recording medium and a version of the format, the recording medium having recorded thereon the data and having hierarchically arranged therein a physical layer, a logical layer, and an application layer, wherein the format and the version of the format are identified from recording medium information read from the application layer of the recording medium;

a storage unit configured to store data in which the version of the format and feature information associated with each other, wherein the feature information indicates processing functions that can be executed by the apparatus, and the association indicates whether the processing functions are executable with the corresponding version, the processing functions comprising moving image recording and static image recording;

a determination unit configured to determine whether or not the processing functions that can be executed are limited based on the identified version, the data stored in the storage unit, and whether the identified version is older than a version supported by the recording apparatus;

a generation unit configured to:
generate first image data for displaying a first image representing that only one of the moving image recording or the static image recording is executable, when the determination unit determines that the processing functions that can be executed are limited; and generate second image data for displaying a second image representing that all the processing functions that can be executed in the apparatus are executable, when the determination unit determines that the processing functions that can be executed in the apparatus are not limited; and a display control unit configured to control display of the first image or the second image in accordance with the generated first image data or the generated second image data.

8. An information processing apparatus comprising:

an identification unit for identifying a format of data recorded on a recording medium and a version of the format, the format identifying a purpose of the data;

a determination unit for determining whether or not processing functions that can be executed in the information apparatus are limited, based on:
  the identified version,
  the data in which the version of the format and feature information are associated with each other, wherein the feature information indicates processing functions that can be executed in the apparatus, and the association indicates whether the processing functions are executable with the corresponding version, the processing functions comprising moving image recording and static image recording, and
  whether the identified version is older than a version supported by the information apparatus; and a display control unit for controlling a display unit to display a first image and a second image, wherein
  the first image is displayed when the determination unit determines that the processing functions that can be executed in the apparatus are limited, the first image representing that only one of the moving image recording or the static image recording is executable, and
  the second image is displayed when the determination unit determines that the processing functions that can be executed in the apparatus are not limited, the second image representing that all the processing functions that can be executed in the apparatus are executable.

* * * * *